C. E. RIEDEL & W. J. BARNES.
SCALE.
APPLICATION FILED NOV. 4, 1915.
1,196,027.
Patented Aug. 29, 1916.
3 SHEETS—SHEET 1.
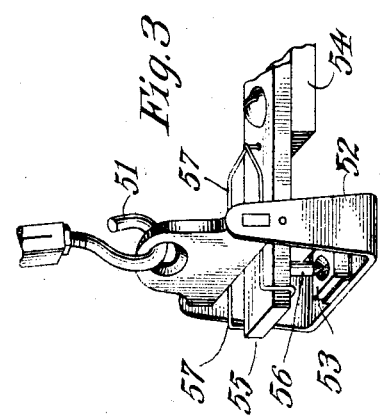
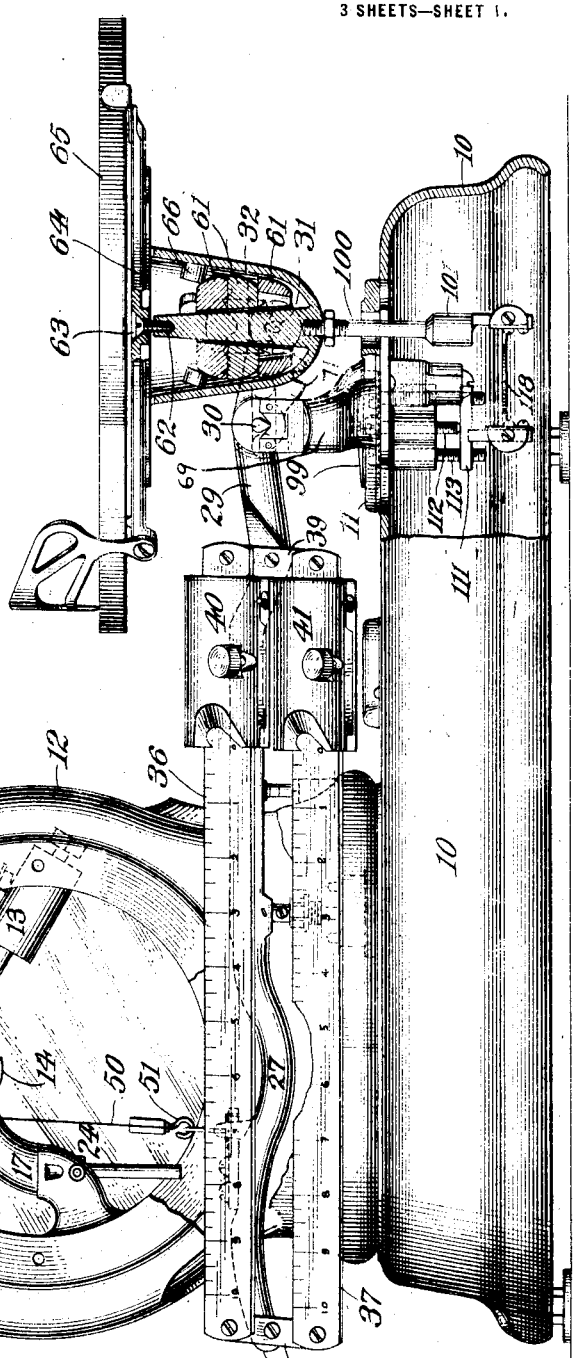
Inventors
C. E. Riedel
and W. J. Barnes
By their Attorney
Kerr Page Cooper & Hayward

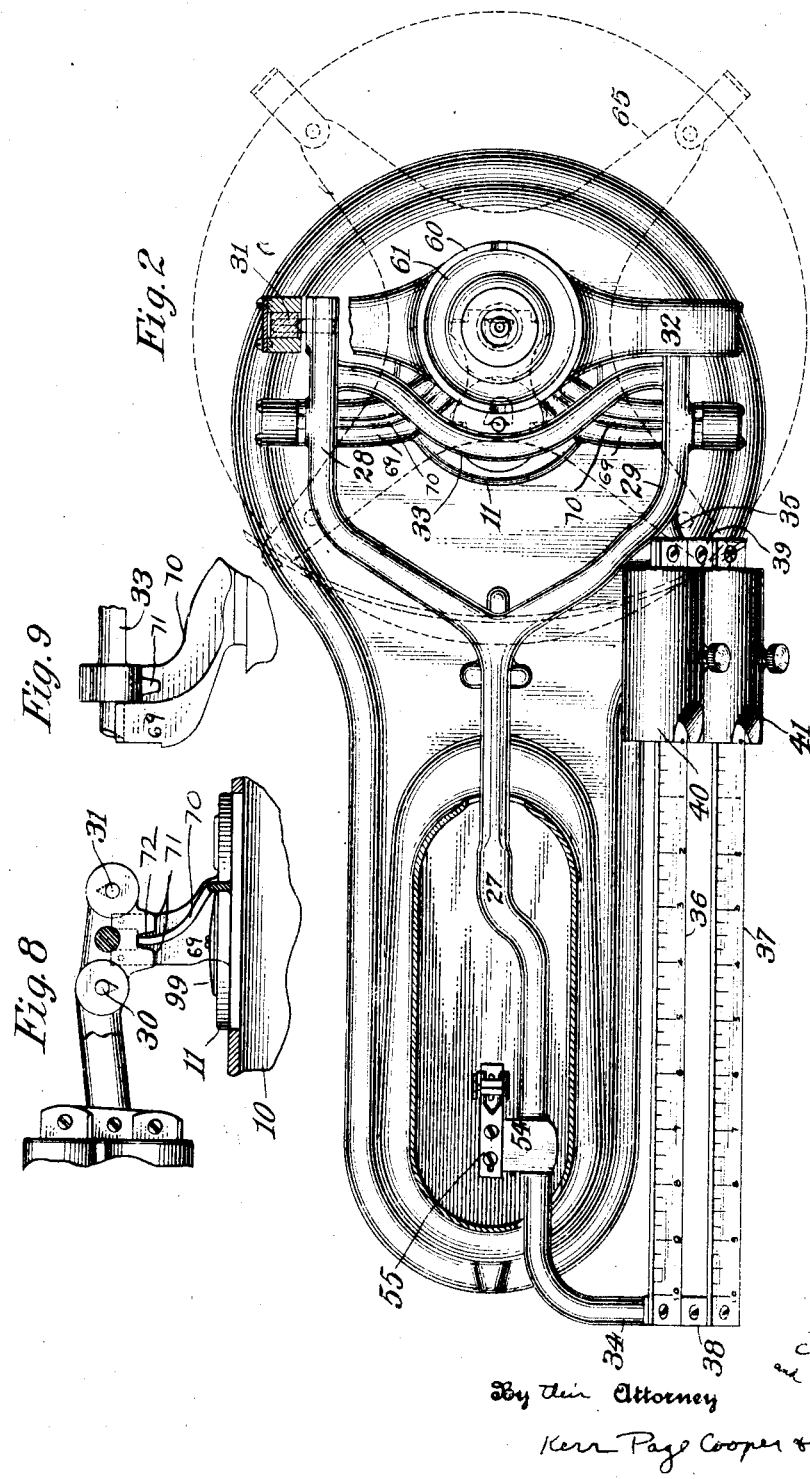

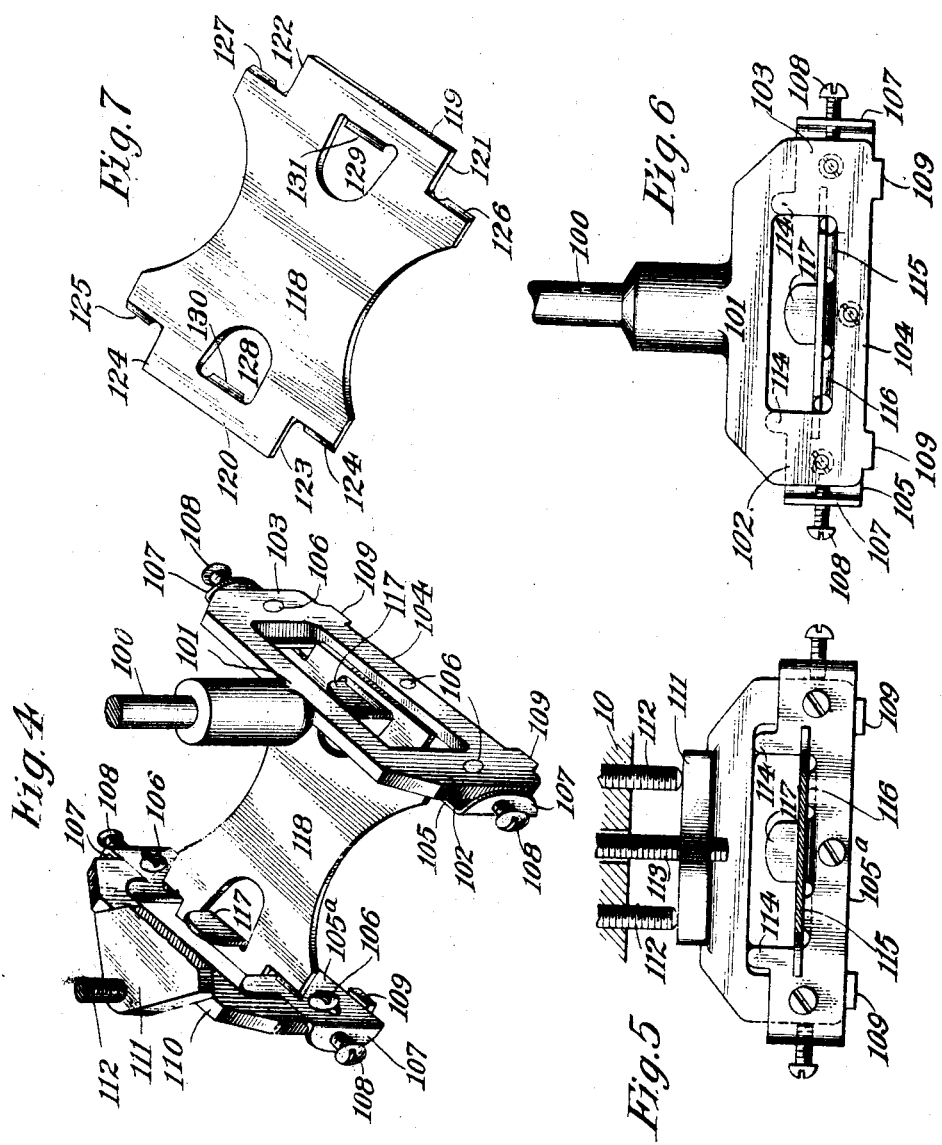

UNITED STATES PATENT OFFICE.

CHARLES EDWARD RIEDEL AND WALTON J. BARNES, OF DETROIT, MICHIGAN, ASSIGNORS TO DETROIT SCALE MANUFACTURING COMPANY, OF DETROIT, MICHIGAN, A CORPORATION OF MICHIGAN.

SCALE.

1,196,027.   Specification of Letters Patent.   Patented Aug. 29, 1916.

Application filed November 4, 1915. Serial No. 59,522.

*To all whom it may concern:*

Be it known that we, CHARLES EDWARD RIEDEL and WALTON J. BARNES, citizens of the United States, residing at Detroit, in the county of Wayne and State of Michigan, have invented certain new and useful Improvements in Scales, of which the following is a full, clear, and exact description.

This invention relates to certain improvements in the scale shown in the patents to F. P. Dunn, No. 856,998, dated June 11, 1907, and to B. D. Emanuel, No. 904,251, dated November 17, 1908.

In the scales above referred to, the main scale lever was a lever of the first order which was normally overbalanced by a weight permanently attached to the lever. The indicating devices are attached to the overbalanced end of the lever and the scale pan is placed on the opposite end of the lever beyond the fulcrum; consequently the scale pan is held normally raised and descends and lifts the opposite end (to which the indicating devices are attached) when a load is placed on the scale. The Emanuel patent showed also a tare beam to compensate for the weights of receptacles. This tare beam was located directly in front of the scale pan or platform. To maintain the scale pan horizontal when loads are on the pan, Emanuel provided a guide arm which extended from the platform up into the indicating housing, where it was pivoted.

The first object of this invention relates to an improved means of overbalancing the lever. In this improved construction, the weight on the end of the main lever is eliminated and the tare beams and poises are substituted therefor.

Another improvement consists in so arranging the scale pan and supporting parts so that various scale pans may be used and the varying weights can be compensated for.

Another improvement consists in securing the main scale lever to the indicating connections in such a manner that jars will not dislodge the connecting stirrup.

Another improvement consists in mounting the pan balancing device, commonly known as the check, in such a manner that it is readily accessible for replacement.

Another improvement consists in providing a rib on the base yoke which is adapted to coöperate with notches in the main lever and hold the main lever in position away from the bearings during shipment so that the pivots cannot be bent or broken.

Other improvements will be more particularly pointed out in the specification and the appended claims.

In the drawings: Figure 1 shows a side view of our improved scale. Fig. 2 shows a top plan view of the base of the scale with the levers and tare beams in place. Fig. 3 shows a detail view of the stirrup which is used to attach the main beam to the connections to the indicators. Fig. 4 is a detail assembly view of the check device. Fig. 5 is a detail end view of the check device shown in Fig. 4. This view also shows the method of attaching the stationary check to the housing. Fig. 6 is a view of the opposite end of the check device as shown in Fig. 4. Fig. 7 is a detail view of the check. Figs. 8 and 9 are detail views showing the method of supporting the main lever during shipment.

In the drawings, 10 is the base of the scale. (Secured to the base adjacent one end is a bifurcated base yoke 11.) Extending up from the other end of the base is a housing 12, which surrounds a number of the working parts of the scale. These parts include a pendulum 13, a compensating cam 14, knife edges 15, which support the pendulum in the V bearings 16, which are carried in the forked ends of a bracket 17. Adjustably attached to the compensating cam and pendulum is an indicating hand 18 which carries an indicating wire 19 which is adapted to move over the fan shaped chart 20 in a well known manner. To prevent excessive movement of the indicating parts, a number of stops are provided. A stop 21 prevents excessive upward movement of the pendulum. Stop 22 coöperates with a post 23, extending from the compensating cam to limit the clockwise movement of the indicating parts. Another post 24 prevents excessive upward movemnt of the main scale lever, the construction of which now will be described.

As previously explained, with scales of this class it has been the practice to use a heavy weight on the end of the lever to overbalance it. This weight has been necessarily quite heavy, since it had not only to balance the scale pan, but also had to raise the tare poises which in their normal position were beyond the fulcrum of the lever. The excessive weight greatly increased the load on the pivots and consequently increased their wear. In this scale the load on the scale lever is diminished by leaving off the weight and reorganizing the other parts of the scale.

The main scale lever 27 is bifurcated and has substantially a Y-shape, see Fig. 2. The two arms 28, 29, carry knife edge fulcrum pivots 30. (One of these is shown in Fig. 1.) Beyond the fulcrum, the arms carry outwardly extending knife pivots 31. These pivots support V bearing agates which are carried in a platform yoke 32. A curved cross member 33 is also provided to stiffen the arms 28 and 29. The stem of the Y-shaped main lever at the end opposite from the knife pivots which carry the platform yoke is bent forwardly, as shown at 34. Extending forwardly from arm 29 is a short extension 35. Two tare beams 36 and 37 are attached to two tie plates 38, 39. These tie plates are attached to the part 34 and extension 35 in such a manner that the tare beams are arranged in echelon, the upper one slightly behind the lower. Sliding on the tare beams are two tare poises 40, 41. The tare poises normally stand at the right of the tare beams and these beams are graduated from right to left.

By referring to Figs. 1 and 2, it will be seen that the tare poises 40, 41, when in normal position, are located to the left of the fulcrum of the main lever; consequently the tare poises and the tare beams take the place of the counterbalancing weight formerly used. The load on the fulcrum pivot is also reduced, since the weight of the tare poises does not have to be counterbalanced. In addition, the location of the tare poises and beams in such position in side platform scales is advantageous in that when an object is being weighed that extends over the edge of the platform, it will not interfere with the operation of the tare poise and obstruct the view of the operator. There is also no danger of the commodity coming in contact with the tare poise or tare beam and interfering with the weighing.

*Nose iron.*—To connect the main lever with the indicating devices, we use the customary flexible tape 50, which is secured to the compensating cam and which carries at its lower end a hook 51. The hook is secured to an upper cross member of a stirrup 52. This stirrup carries an agate bearing 53, which is conically cupped. The main lever 27 is provided with a lug 54. Adjustably secured to this lug is a nose iron 55, which carries a pointed pin 56, which is adapted to rest in the conical depression in the agate bearing 53. A bent piece of wire 57 engages the upper and lower sides of the nose iron and extends under the cross member of the stirrup 52. When there is tension on the ribbon 50 the wire 57 does not contact with the cross member of the stirrup, but should the tension on the ribbon be released the wire 57 contacts with the cross member and prevents the accidental displacement of pin 56 from the agate bearing. At the same time the indicating connections are easily removable from the nose iron.

*Lead pocket and platform support.*—The platform yoke 32, as shown in Figs. 1 and 2, carries a lead pocket 60, which is integral therewith and which extends downwardly therefrom. The lead pocket is hollow to receive a number of weights 61 which weights are ring shaped. A central post 62 extends up through the lead pocket and at its top is provided with a threaded hole to receive a screw 63 which screw secures a platform 64 to the lead pocket and platform yoke. The platform in the scale illustrated carries a plate 65 which supports the articles to be weighed. In some cases scoops are substituted for the plate 65, in which case it is merely necessary to add or remove one or more of the circular ring shaped weights 61 to correct the scale for the varying weights of scoops or receptacles used. Small weights 66 are also used in the lead pocket for correcting and adjusting the scale.

*Check device.*—In former scales, particularly in the Emanuel patent previously referred to, the check device which maintained the scale pan horizontal was located in the chart housing 12ª. This location of the check necessitated that it be built in place and frequently inexperienced persons in unpacking the scale and in attempting to remove or replace the check disarranged the check device so that the scale became inaccurate. The improved construction changes the position and construction of the check so that it can be easily replaced by an inexperienced person.

The improved check will now be described. Screwed in the bottom of the lead pocket is a check spindle 100. This spindle extends downwardly through an aperture in the base of the scale and has secured to its lower end a check plate supporting bracket 101. This bracket is shown in detail in Figs. 4 and 5, and comprises two arms 102 and 103 and a connecting cross member 104. A check plate 105 is secured to this bracket by screws 106. One of these screws is screwed into each of the arms 102 and 103 and one into the cross member 104. The screws pass through elongated slots in the plate. The ends of the plate are provided with turned up lugs 107, through which adjusting screws 108 are threaded. By tightening these screws 108 into contact with arms 102, 103 of the bracket 101, the plate 105 can be adjusted into the correct transverse position with respect to the bracket 101. Thereafter the screws 106 can be tightened and the plate held rigid with the bracket. The bracket 101 is also provided with inwardly turned lugs 109 which extend under the bottom of the plate 105 and aid the screws 106 in supporting the plate in position. A second check bracket 110 is provided, which is rigidly secured to the scale housing. To secure the bracket to the housing 10 and to level the bracket, the top surface of the bracket 110 is made flat, as shown at 111. Two screw-threaded studs 112 are threaded in the housing and extend downwardly and contact with the top flat surface 111 of the bracket. Two other threaded studs 113 also extend through holes in the housing and extend downwardly and engage threads in the bracket 110. By adjusting these different studs the bracket may be leveled and alined properly. It will be understood that the heads of the studs 112 and 113 are in a recessed pocket in the base yoke 11 and after these adjustments are made the recessed pocket in the base yoke is covered by a plate 99. The bracket 110 supports a check plate 105ª in the identical manner as does bracket 101 and accordingly the same reference characters and description will apply.

*Check plates.*—The check plates 105 and 105ª for each bracket are identical and therefore a description of one only will be given. Similar characters will be applied to the drawings for both plates. The plates 105 and 105ª are provided with upwardly extending lugs 114 which have their inner sides cut parallel to one another. Extending upwardly from the base portion 104 of the plate are two beveled portions 115 and 116, which are so shaped to form knife edge supports for the check to be hereafter described. The bevels of these knife edges for the two plates 105 and 105ª extend toward one another, as shown in Figs. 5 and 6. Extending upwardly from the center of the base portion of the plates are ears 117. The ears 117 of the two plates are also bent so that they are out of the plane of the check plates and these ears, when the plates are in position on the brackets, extend toward one another, as shown in Figs. 4, 5 and 6.

*Check.*—To hold the scale platform in horizontal position the check is employed. This check consists of the plate 118 shown in Figs. 4 and 7. The plate 118 is provided with extending portions 119 and 120 having parallel cut sides and the extending portions 119 and 120 are adapted to fit loosely between the parallel cut edges of lugs 114 on plates 105 and 105ª. The plate 118 is beveled to form knife edges 124 and 125 and 126 and 127. The edges 124 and 125 are in alinement with each other and parallel with the edges 126 and 127 at the opposite side of the plate. The plate 118 is apertured, as shown at 128 and 129. The straight outer edges of the apertures are struck up to form knife edges 130 and 131. The points of these knife edges 130 and 131 are in alinement with the points of knife edges 124, 125 and 126, 127, respectively.

In placing the check in position, it is placed with the ears 117 extending up through the apertures 128 and 129 and when in this position the knife edges 124, 125 and 126, 127 will bear against the outer face of the plates 105 and the edges 130, 131 will bear against the inner face of the ears 117. When so placed the distance between knife edges 124, 125 and 130 and edges 126, 127 and 131 is exactly equal to the distance between the fulcrum 30 and load pivot 31 on the main lever. In this manner the scale platform is always maintained horizontal when loads are applied to the scale pan and at the same time the knife edges minimize the friction which would make the scale inaccurate. The check can be reached for replacement by merely reaching up under the base of the scale.

In shipping scales it has been found necessary to protect the knife pivots from bending or breaking. We provide a means in our scale for this purpose by ribs on the upper side of the fulcrum arm, as shown at 70 in Figs. 2 and 8. Downwardly extending lugs 71 are provided on the lower edge of the forks 28 and 29 of the main lever just to the right of the fulcrum pivot. In shipping the scale the main lever is lifted from the bearings and displaced to the left until the notch 72 between lugs 71 engages the rib 71 on the fulcrum arm. After the lever is held down it is impossible for it to shift its position and damage the pivots.

What we claim is:

1. In a scale, the combination of an indicating hand and pendulum connected thereto, of a scale beam of the first order of leverage, a scale platform on one end thereof, connections between the scale beam and pendulum, a tare beam adjacent the scale beam and attached thereto, the points of attachment of said beam being both located on said scale beam on the opposite side of the fulcrum from the scale platform, and a tare poise on said tare beam the said tare poise and tare beam by their weight and location at one side of the fulcrum being adapted to overbalance the scale beam and elevate the platform and at the same time maintain the pendulum in elevated position.

2. In a scale in combination, a main lever of the first order, a scale platform on one end of said lever, an indicating arm attached to the opposite end of the said lever, a pendulum associated with the indicating hand, a plurality of tare beams extending in the direction of the main lever and having points of attachment therewith, one point of attachment being adjacent the end of the lever which has the connection to the indicating hand and the other point of attachment being located adjacent the fulcrum, but on the opposite side thereof from the scale platform whereby the entire weight of the tare beams is applied to the main lever on the opposite side of the fulcrum from the scale platform, and a plurality of tare poises on said tare beams, the weight of said poises being adapted to coöperate with the entire weight of the tare beams to overbalance the main lever, elevate the scale platform and maintain the pendulum in raised position until a load is placed on the scale.

3. In a scale, in combination, a Y-shaped main scale lever of the first order, a scale platform on the Y-shaped end of said lever, indicator elements secured to the opposite end of the said lever, pendulum means associated with the indicator elements and the scale lever, and a tare beam and a poise thereon secured to said lever intermediate the indicator elements and the fulcrum of the lever, said tare beam and poise being adapted to overbalance the main scale lever and maintain the platform in elevated position; said tare beam and poise being adapted to swing the pendulum to upper position and to swing the indicator to normal zero position.

4. In a device of the class described, in combination, a scale lever comprising a Y-shaped lever having fulcrum pivots intermediate the ends of the Y arms, load supporting pivots on the ends of the arms of said lever, forwardly extending extensions from said lever at one side of the fulcrum, and tare devices connected to said extensions, said tare devices being adapted to overbalance the end of the lever supporting the load and maintain that portion of the lever elevated.

5. In a scale, the combination of a Y-shaped scale lever, a plurality of pivots on the bifurcated Y arms, one pair of said pivots forming the support for a scale platform and another pair of said pivots forming a fulcrum for the lever, said scale lever having a forwardly extending portion at the end opposite the bifurcated portions, a tare beam connecting the forwardly extending portion and one of the bifurcated arms, and a tare poise thereon coöperating with the tare beam to overbalance the main scale lever.

6. In a scale, a main scale lever, a platform thereon, in combination with means for maintaining said platform in horizontal position, comprising a plurality of check plate supporting elements, check plates thereon, said plates having a pair of upwardly extending knife edges struck up therefrom, an ear between said knife edges, and a check intermediate said check plates supported by the knife edges and contacting with the aforesaid ears.

7. In a scale, a main lever, a base, a platform supported on the main lever, means for maintaining the platform in a horizontal position, comprising, in combination, a check supporting element secured to the base, a second check supporting element secured to the platform, said elements having upwardly extending ears over which a check may be placed, and a check having knife edges coöperating with said check supporting elements and removable over the aforesaid ears.

8. In a scale having a main lever of the first order, a platform pivotally supported thereon, a check device for maintaining the platform in horizontal position comprising, a spindle extending downwardly from the platform into the base of the scale, a second member extending from the base downward into the base of the scale and spaced from the first spindle, check supporting elements on the spindle and upon said member, said elements comprising upwardly extending side members and upwardly extending intermediate members and the height of the said intermediate members being of lesser height than the height of the side members, and a check pivotally connecting the said check supporting elements said check having apertures therethrough through which the intermediate members project to maintain the check in place, said lessened height of the intermediate check supporting members permitting the check to be removed without disassembling of the parts.

9. In a scale having a fulcrumed main lever of the first order, a platform pivotally supported thereon and means for balancing said platform, comprising, in combination, a spindle connected to said platform and extending downwardly into the base of the scale, a check plate bracket secured to the base and extending downwardly therefrom, a second check plate bracket secured to said spindle, check plates secured to said brackets, adapted to support a check, and a check connecting said check plates and adapted to be removed and replaced at will therebetween.

10. In a scale having a platform, means for maintaining the platform in horizontal position, comprising, in combination, a spindle attached to said platform and having a check plate bracket at its end, a second bracket secured to the base of the scale, check plates on said brackets, said plates each having an ear thereon over which a check may be placed, and a check pivotally connecting the said check plates and removable over the ears thereon, as set forth.

11. In a scale, a base, a scale platform with means to maintain the same in horizontal position, comprising, in combination, a check plate bracket secured to said base, means for leveling the said bracket with respect to said base, a spindle attached to said platform and extending into the base of the scale, a bracket on said spindle, check plates on said brackets, and a check having coöperating knife edges to pivotally connect said check plates and maintain the scale platform in horizontal position.

12. In a scale, in combination a base, a main lever pivotally mounted thereon, a platform pivoted on the main lever, a check device for maintaining the platform horizontal, said device comprising, a check supporting element secured to the base, a check supporting element secured to the platform, said elements having side supporting portions and intermediate upwardly extending portions of less height than the side portions, a removable check plate having apertures therein engaging over the intermediate upwardly extending portions and having portions of its ends projecting between the before mentioned side supporting portions of the check supporting elements, the said relatively lower intermediate portions of the check supporting elements permitting the manual removal of the check without the disassembling of the parts.

13. In a scale, in combination, a base, a platform, a check plate supporting element adjustably secured to the base, a check plate supporting element secured to the platform, check plates adjustable transversely on said supporting elements, a pair of knife edges extending upwardly from said plates, an ear extending upwardly from each of said plates, said ear having one surface in line with the surface of the check plate, and a check connecting the said check plates, said check having coöperating knife edges to coöperate with the surface of the check plate and the ears thereon to maintain the distance between said check plates constant.

14. In a scale, in combination, a base, fulcrum arms secured thereto, a main lever having notches thereon and ribbing on the fulcrum arms adapted to engage the said notches and secure the lever against lateral displacement for the purpose described.

15. In a scale, in combination, a scale lever of the first order; a nose iron thereon; indicating devices, a flexible element connecting with the indicating devices; means for connecting the flexible element with the scale lever, comprising a stirrup, and a spring engaging the bottom of the nose iron and looping over the top thereof and extending into the stirrup, said spring being normally slightly spaced from the top of the stirrup and being adapted to contact therewith when the tension on the flexible element is relieved to prevent the pin from being displaced from the bearing.

16. In a scale; in combination, a base; a main lever pivotally mounted thereon; a platform pivotally mounted on the lever; a check device comprising a check plate supporting element connected with the base; a second check plate supporting element connected with the platform; check plates adjustable transversely on said supporting elements; and a check pivotally connecting the aforesaid check supporting plates to maintain the platform horizontal.

17. In a scale, in combination, a base; a scale beam of the first order pivoted upon the base; a scale platform pivoted upon one end thereof; a tare beam having a poise thereon attached to the scale beam, said tare beam being so attached to the beam that the entire weight of the tare beam is applied to the scale beam at the opposite side of the fulcrum from the scale platform whereby the entire weight of the tare beam and the poise thereon serves as a counter-balance for this scale beam, and maintains the scale platform elevated; a check device for maintaining the platform in horizontal position, said check device comprising a check supporting means extending downwardly into the base; a second check supporting element projecting downwardly into the base from the scale platform; and a check member pivotally connecting the aforesaid check supporting elements.

In testimony whereof we affix our signatures in the presence of two subscribing witnesses.

CHARLES EDWARD RIEDEL.
WALTON J. BARNES.

Witnesses:
  NELL BARNES,
  ELLA K. WINTER.